United States Patent [19]

Fujimoto

[11] Patent Number: 5,095,508
[45] Date of Patent: Mar. 10, 1992

[54] IDENTIFICATION OF VOICE PATTERN

[75] Inventor: Junichiroh Fujimoto, Yokohama, Japan

[73] Assignee: Ricoh Company, Ltd., Tokyo, Japan

[21] Appl. No.: 511,979

[22] Filed: Apr. 16, 1990

Related U.S. Application Data

[63] Continuation of Ser. No. 227,791, Aug. 3, 1988, abandoned, which is a continuation of Ser. No. 694,758, Jan. 25, 1985, abandoned.

[30] Foreign Application Priority Data

Jan. 27, 1984 [JP] Japan .................................. 59-14112

[51] Int. Cl.$^5$ ................................................ G10L 5/00
[52] U.S. Cl. ......................................... 381/43; 381/35
[58] Field of Search ................................ 381/41–43, 381/35

[56] References Cited

U.S. PATENT DOCUMENTS

| | | | |
|---|---|---|---|
| 3,641,496 | 2/1972 | Slavin | 381/51 |
| 4,297,528 | 10/1981 | Beno | 381/45 |
| 4,489,437 | 12/1984 | Fukuichi et al. | 381/51 |
| 4,570,232 | 2/1986 | Shikano | 381/43 |
| 4,608,708 | 8/1986 | Watanabe | 381/43 |

Primary Examiner—Emanuel S. Kemeny
Attorney, Agent, or Firm—Oblon, Spivak, McClelland, Maier & Neustadt

[57] ABSTRACT

A voice pattern identifying system includes a library for storing therein a plurality of registered voice patterns and a register array into which a sampled voice pattern is temporarily stored for comparison with said registered voice patterns one by one. The voice pattern is represented by a plurality of frames which are sampled at a predetermined time interval and each of which includes a predetermined number of data at different frequency ranges. The registered voice patterns are stored as compressed in the library so that each frame is accompanied by a compression data indicating how many times the corresponding frame should be repeated with time. In accordance with the present invention, there is provided a pattern compander which only modifies the compression data of either of the registered or sample voice pattern so as to make the number of frames identical before determination of the degree of similarity the two voice patterns.

5 Claims, 2 Drawing Sheets

IDENTIFICATION OF VOICE PATTERN

This application is a continuation of application Ser. No. 227,791, filed on Aug. 3, 1988, now abandoned, which is a continuation of Ser. No. 694,758, filed Jan. 25, 1985, abandoned.

BACKGROUND OF THE INVENTION

1. Field of the Invention

The present invention relates to a method and system of identifying a voice pattern, and, in particular, to a technique for identifying a voice pattern of a time and frequency representation with compression information.

2. Description of the Prior Art

For the recognition of voice such as spoken words and messages by a device, it is well known to convert the voice into a pattern of time and frequency representation. Such a voice pattern is typically represented in the coordinate system having the abscissa taken for time and the ordinate taken for frequency. Such voice patterns for a predetermined number of words or messages are previously stored in a library, and when a word is spoken, it is processed into a voice pattern of time and frequency representation for comparison with those stored voice patterns one after another thereby identifying the spoken word.

In such a case, even if the same word is spoken by the same speaker, its time span varies nonlinearly each time when spoken. Under the circumstances, in order to carry out the identification of voice pattern by absorbing such temporal fluctuations, there is proposed a method to utilize dynamic programming, or there is proposed another method to utilize the properties of membership functions in fuzzy logic, wherein margins are provided in the pattern. In particular, in accordance with the latter method, use is made of appropriate means so as to make two patterns to be compared to be equal in time length, and then the two patterns are superimposed one on top of another, whereby the degree of similarity is determined depending on how well the two patterns match.

It is generally desired to store as large number of voice patterns as possible in the library, and in order to attain this objective, the voice pattern is often stored as compressed. Such a voice pattern, which is compressed to remove redundancy, is typically shown in FIG. 1, in which the horizontal axis is taken for frequency and the vertical axis is taken for time. As shown in FIG. 4, the frequency is divided into a plurality of bands $F_1, F_2, \ldots, F_n$ and the binary distribution of voice pattern during a selected time interval may be determined by comparing each frequency component with a predetermined threshold. Such a set of binary data for a selected time interval is arranged horizontally and such a set is called frame. In FIG. 1, only the first two frames of a voice pattern are shown. Furthermore, in the example illustrated in FIG. 1, the voice pattern is determined by sampling the same word spoken by the same speaker three times and adding these three sampled data together. Thus, the digit "3" in the pattern indicates the highest frequency of occurrence and "0" indicates the lowest frequency of occurrence.

The voice pattern shown in FIG. 1 also includes a compression data for each frame and such compression data is indicated by A. The compression data indicates how may times the corresponding frame should be repeated as time goes on. That is, in the illustrated example, the compression data of the first frame is "1" so that this frame should be used only once, but since the compression data of the second frame is "3" so that this frame must be used three times in succession or repeated twice. Such a compression scheme is quite advantageous because the next two frames, i.e., third and fourth frames, are not actually stored, but they are effectively stored in the compression data for the second frame, thereby allowing to cut down the data storage area.

In this manner, since the voice patterns are normally compressed when stored, when such stored voice patterns are to be used for comparison with a sampled voice pattern for mechanical recognition of spoken word, the compressed data must be expanded to original uncompressed state for comparison with the uncompressed sample data. This is highly disadvantageous, because the stored data must be compared with the input data one after another and each of the stored data must be subjected to expanding processing when compared with the input data.

SUMMARY OF THE INVENTION

It is therefore a primary object of the present invention to obviate the disadvantages of the prior art as described above and to provide an improved method and system for mechanically identifying human speeches.

Another object of the present invention is to provide a voice pattern identifying method and system simple in structure and fast in operation.

A further object of the present invention is to provide a voice pattern identifying method and system capable of comparing two voice patterns of time and frequency representation even if one of the patterns is compressed in time while the other is not.

Other objects, advantages and novel features of the present invention will become apparent from the following detailed description of the invention when considered in conjunction with the accompanying drawings.

DESCRIPTION OF THE PREFERRED EMBODIMENTS

The present invention will now be described in detail by way of embodiment with reference to FIG. 2, which illustrates in block form a system for mechanical identification of speech, such as spoken words and messages As shown, the present speech identification system includes a microphone 1 which converts voice or pressure waves, for example, of spoken word into an electrical signal. Such an electrical voice signal is supplied to a filter bank 2 comprised of a plurality of bandpass filters of different frequency range, so that the electrical voice signal is frequency-analyzed in succession at a predetermined time interval thereby producing the voice pattern frame by frame.

Figure 5:
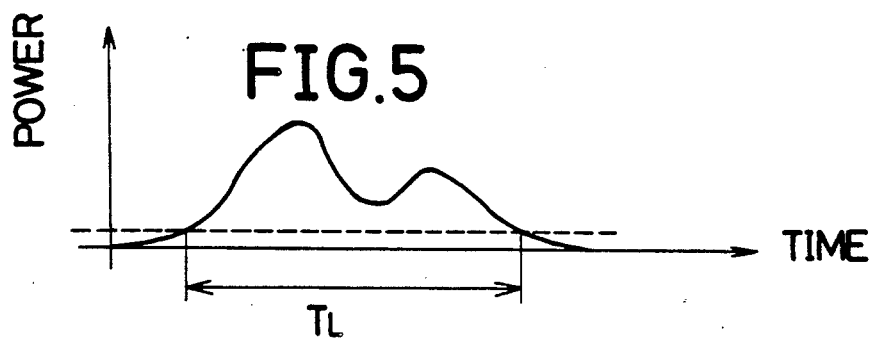
FIG. 5 is a graph useful for explaining the time span of a speech.

Provided as connected from the filter bank 2 is an expanse detector 3 which determines the time span or duration of the sampled voice pattern or spoken word. Described more in detail, as shown in FIG. 5, when a word is spoken, the sound level or power changes with time and the time period from the point in time when the power level has exceeded a predetermined threshold to the point in time when the power level has decreased below the threshold as indicated by $T_L$ may be determined as the expanse or time span of sampled voice or spoken word. This is relatively important because even if the same word is spoken by the same speaker, its time length $T_L$ varies almost each time when it is spoken so that the sampled data or the data for comparison must be either stretched or compressed to carry out a meaningful comparison, as will be discussed more in detail later.

Figure 3:
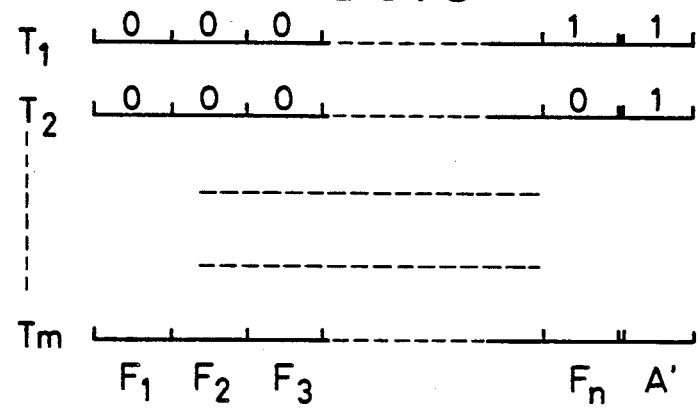
FIG. 3 is a schematic illustration showing the more detailed structure of the register 4 and time length register 4a provided in the system of FIG. 2.
Figure 4:
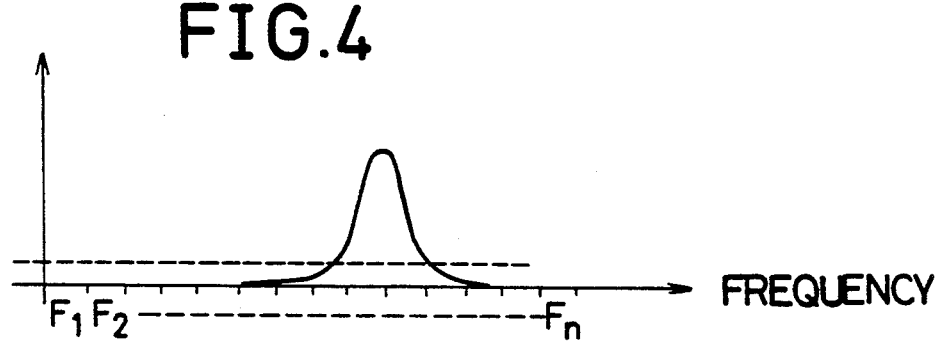
FIG. 4 is a graph useful for explaining how frame data for a selected time interval are sampled.

The illustrated system further includes a register 4 and a time length register 4a, and its detailed structure is schematically shown in FIG. 3. As shown in FIG. 3, the register 4 and 4a actually includes a plurality of multibit registers, and in the illustrated embodiment, there are provided m number of multibit registers each capable of storing n+1 bits of binary data. It is to be noted that the first row $T_l$ is to store the first frame of the sampled voice and the second row is to store the second frame of the sampled voice, and so forth. The number m of registers is determined in consideration of the longest speech to be stored as the data for comparison. . Thus, all of the frame registers $T_l$ through $T_m$ are not used all the time, and they are partially used if the sampled voice is relatively short in time length. Each frame register is capable of storing n number of frequency data in the form of binary bits for n different frequency bands and its rightmost bit indicated by A' is the compression data. It is to be noted that when a word is spoken to the microphone 1 and its voice pattern is supplied into the register 4 frame by frame, the compression data in the region A' are all 1's because no compression has been carried out and only the sampled voice data are supplied into the two-dimensional register array.

Figure 1:
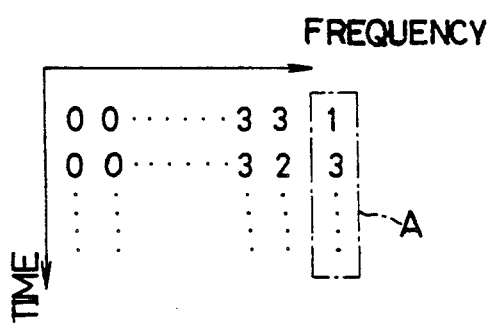
FIG. 1 is a schematic illustration showing a typical digital voice pattern of time and frequency representation with compression information.
Figure 2:
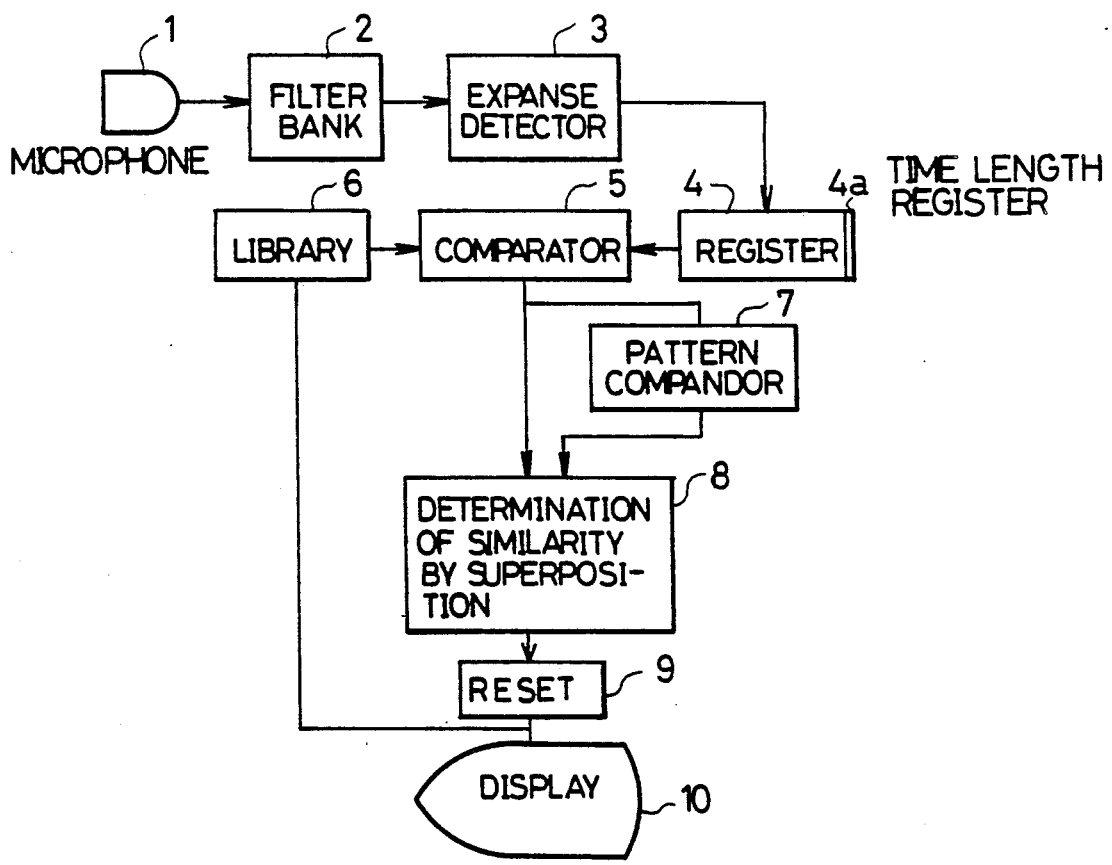
FIG. 2 is a block diagram showing a speech identification system constructed in accordance with one embodiment of the present invention.

Also provided in the system of FIG. 2 is a library 6 which stores a plurality of voice patterns with compression data in the form as shown in FIG. 1. Such voice patterns have been previously stored in the library 6 as selected according to particular needs and they may indicate particular words or messages. As shown in Fig. 1, the stored voice patterns are in the compressed form thereby allowing to store an increased number of data for a given area or alternatively to use a smaller capacity memory device. Connected between the register array 4 and the library 6 is a comparator 5 which compares the sampled data in the register array 4 with the data for comparison from the library 6 and determines a difference in time length between the two. In this case, as is well known for one skilled in the art, the library 6 can supply the stored data one after another for comparison according to a predetermined sequence until all of the data have been compared, whereby the data having the highest degree of similarity is selected to identify the voice corresponding to the sampled data in the register array 4. Or, alternatively, it may be so structured that the library 6 supplies the stored data one after another for comparison in the order of having a time length closer to the sampled data in the register array 4. In either of these schemes, it may be so structured to identify the selected data for comparison as the voice of the sampled data in the register array 4 when the degree of similarity as a result of comparison is within a predetermined margin.

Also provided is a pattern compandor 7 as connected between the comparator 5 and a similarity discriminator 8. It is to be noted that the pattern compander 7 structurally corresponds to the time length register 4a. That is, the pattern compander 7 includes an m-bit column register. In one form of the present embodiment, prior to each comparison of data by superposition, all of the compression data in the region 4a are duplicated in the pattern compandor 7. Then depending on the result of time length comparison at the comparator 5, one or more of selected ones of the rightmost bits (compression data), which are all 1's when stored in the time length register 4a, are changed to 2 or more. On the other hand, in the case of another form of the present embodiment, prior to each comparison of voice data by superposition, all of the compression data of the voice pattern from the library 6 are duplicated in the pattern compandor 7.

The similarity discriminator 8 is well known for one skilled in the art and thus its detailed description will be omitted. However, in this block, the sampled data from the register array 4 is compared with the selected voice data from the library as being superimposed one on top of the other to determine the degree of similarity between the two. For example, the products of corresponding bits are taken and a sum of the resulting products is calculated to determine the degree of similarity. The similarity discriminator 8 is connected to a reset unit 9 which causes all of the bits in the pattern compandor 7 to be reset to 1's upon completion of one similarity comparison processing. Also provided as connected to the reset unit 9 is a display unit 10 which displays the information identifying the selected voice pattern.

In operation, when a voice, such as word and message, is pronounced, its pressure wave reaches the microphone 1 to be converted into an electrical voice signal which is then applied to the filter bank 2 where the corresponding voice pattern in the form of time and frequency representation is created. Then, the voice pattern is processed at the expanse detector 3 thereby determining the time length of the sampled voice pattern which is then stored in the register array 4. In this case, as described before, each bit in the column of the time length register 4a is set to be "1", indicating no compression for each frame.

In the preferred mode, the sampling at the filter bank 2 is carried out at the time interval of 10 milliseconds and the number of bandpass filters range from approximately 8 to 30. If there are provided eight bandpass filters, 8 bits of data for frame are stored into the frame register array 4 every 10 milliseconds. If the time length or expanse of the spoken word is 600 milliseconds, then there will be 480 bits of data in total. With eight bandpass filters in the filter bank 2, there are produced eight bits of data for each frame so that only eight bits in each frame register, e.g., from $F_1$ through $F_8$, will be used. Furthermore, since the data sampling takes place every 10 milliseconds, there will be produced 60 sets of eight-bit data and thus only 60 frame registers $T_i$ will be used to store the sampled data in the frame register array 4. All of the compression data bits for these 60 frames in the time length register column are set to be "1" when the sampled data are stored into the register array 4.

Now, the sampled voice pattern stored in the register array 4 is then compared with the registered voice patterns stored in the library 6 one by one. As described before, since the registered voice patterns stored in the library 6 are compressed, a measure must be taken to carry out a comparison between the sampled voice pattern, which is not compressed, and the registered voice patterns, which are compressed. However, the time length or number of frames of each of the registered voice patterns is known and also the time length or number of frames of the sampled voice pattern is known. Thus, in accordance with one mode of operation, when the sampled voice pattern is to be compared with one of the registered voice patterns, their numbers of frames are first compared at the comparator 5, and upon comparison, the compression data of the smaller number of frames is copied into the pattern compandor 7. Since the number of frames indicated by the compression data now stored in the pattern compandor 7 is smaller, a required number of additional frames are inserted by increasing the compression data at selected portions.

One preferred method of insertion of additional frames is the linear insertion. For example, if the sampled voice pattern in the register array 4 has been found to be smaller in the number of frames than the registered voice pattern from the library 6 for comparison, then the all of the compression data bits, which are all 1's, in the time length register column 4a are copied into the pattern compander 7. If the current registered voice pattern from the library 6 has the time length of 620 milliseconds and thus 62 frames, the sampled voice pattern in the register array 4 is short of 2 frames as compared with the current registered voice pattern and thus two frames must be added to the sampled voice pattern. According to the present embodiment of the present invention, two frames are linearly inserted into the sampled voice pattern, but in this case two frames themselves are not actually inserted; instead, only the compression data now copied in the pattern compandor 7 is appropriately altered to effectively carry out this linear insertion of additional frames.

Described more in detail, since the sampled voice pattern now stored in the register array 4 has 60 frames and the number of frames to be inserted is two, in order to insert these two additional frames linearly or uniformly, 60 must be divided by three (i.e., the number of frames to be added plus one). Thus, in the present example, the first additional frame, which is the 20th frame, is inserted between the 20th and 21st frames and the second additional frame, which is the 40th frame, is inserted between the 40th and 41st frames. Thus, in the pattern compandor 7, the 20th and 40th compression data bits are each changed from "1" to "2". Under the condition, when the degree of similarity between the sampled voice pattern in the register array 4 and the registered voice pattern from the library 6 is to be compared at the similarity discriminator 8, the compression data in the time length register 4a is disregarded and instead the modified compression data in the pattern compandor 7 is used for the sampled voice pattern in the register array 4. In this manner, the time length is identical between the two voice patterns to be compared.

The determination of the degree of similarity or matching between the two voice patterns are preferably carried out by having one of the voice patterns superimposed on the other. Described more in detail, a product between the two voice patterns is calculated. In order to do this, subproducts are calculated frame by frame and when a subproduct between the two corresponding frames is calculated, reference is made to the compression data of the registered voice pattern and the modified compression data in the pattern compandor 7 for the sampled voice pattern. For example, if the current registered voice pattern is identical to that of FIG. 1, then the first subproduct is calculated between the first frame of the registered voice pattern and the first frame of the sampled voice pattern. However, the second, third and fourth subproducts are calculated between the second frame of the sampled voice pattern and each of the second, third and fourth frames of the sampled voice pattern.

If the degree of similarity thus determined is not within a predetermined range, then the process proceeds to the reset unit 9 and thus the all of the compression data in the pattern compandor 7 are reset to 1's. Then, the next registered voice pattern is selected at the library for comparison with the sampled voice pattern stored in the register array 4. This process is repeated until the predetermined degree of similarity is found or all of the registered voice patterns have been used for comparison. In the former case, when the predetermined degree of similarity has been found, the current registered voice pattern is displayed at the display unit 10 and the process is terminated.

The following is a subroutine program written by FORTRAN for calculating the degree of similarity by superimposition as described above, in which DICT is the registered voice pattern; INP is the sampled voice pattern; NF is the number of frames after adjustment of time length; and ID is the degree of similarity.

```
      SUBROUTINE SUPER(DICT,INP,NF,ID)
      INTEGER DICT(9,100), INP(9,100)
      ID=0
      J3=1
      DO 10 J=1,NF
      J1=INP(9,J)
      DO 10 J2=1,J1
      JD=DICT(9,J3)-1
      IF(JD.LT.0) GO TO 5
      DO 10 I=1,8
      ID=DICT(I,J3)*INP(I,J2)+ID
      GO TO 10
    5 J3=J3+1
   10 CONTINUE
      RETURN
      END
```

While the above provides a full and complete disclosure of the preferred embodiments of the present invention, various modifications, alternate constructions and equivalents may be employed without departing from the true spirit and scope of the invention. For example, in the above-described embodiment, it has been described to insert additional frames to match the time length or total number of frames between the two voice patterns for comparison; however, it may be so structured to delete one or more of the frames from one of the voice patterns for comparison. Therefore, the above description and illustration should not be construed as limiting the scope of the invention, which is defined by the appended claims.

'What is claimed is:

1. A system for carrying out voice recognition using a time-frequency matrix pattern which is defined by dividing an input voice into a plurality of n frequency ranges and sampling in timed sequence a plurality of m frames of frequency pattern, each frame of frequency pattern being a function of voice power per each frequency range, comprising:

first storing means for storing compressed time-frequency matrix patterns containing compression information which indicates how many frames a particular frequency pattern is repeated back to back for a predetermined number of voices;

second storing means for storing a time-frequency matrix pattern of said input voice to be recognized after extraction and compression information for each frequency pattern in timed sequence;

compression information series correcting means for correcting at least one of the compression information series so as to attain agreement therebetween by comparing the total of a first compression information series stored in said first storing means and the total of a second compression information series stored in said second storing means;

comparing means for comparing frequency patterns read out from said first and second storing means in accordance with the first and second compression information series obtained from said compression information series correcting means; and determining means for determining a degree of similarity of said input voice with one of the voices stored in said first storing means as a result of said comparing means.

2. The system of claim 1, wherein said compression information series correcting means compares the total of said first compression information series stored in said first storing means and the total of said second compression information series stored in said second storing means to thereby carry out correction to make them identical by expanding the compression information series of the one which has a smaller total.

3. The system of claim 2, wherein the expansion of said compression information series is effected by increasing the compression information contained in the compression information series by a predetermined number.

4. The system of claim 1, wherein said compression information series correcting means compares the total of said first compression information series stored in said first storing means and the total of said second compression information series stored in said second storing means to thereby correct them to be identical by contracting the compression information series of the one which has a larger total.

5. The system of claim 4, wherein the contraction of said compression information series is effected by reducing the compression information contained in said compression information series by a predetermined amount.

* * * * *